Patented Nov. 24, 1942

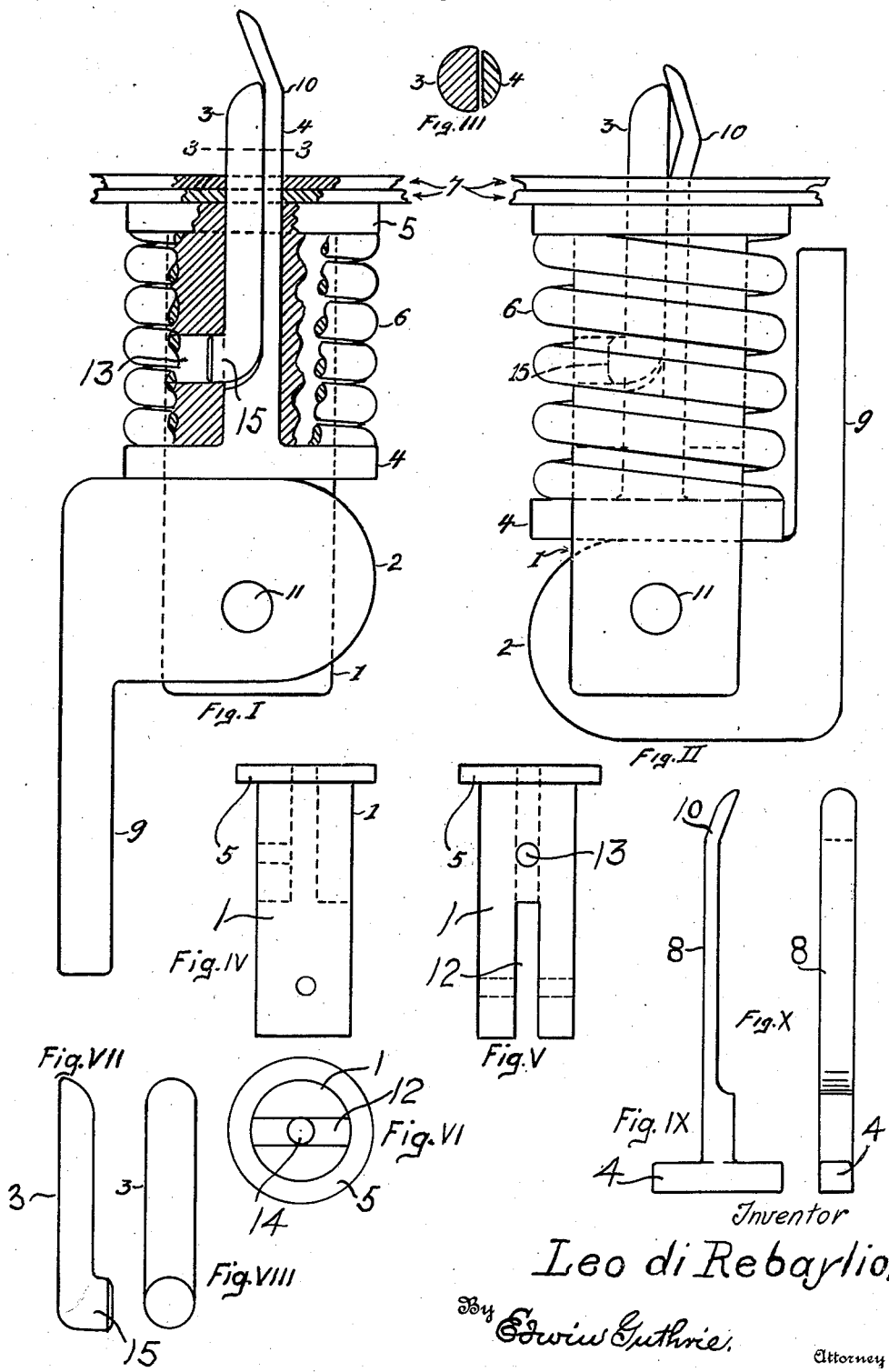

2,303,260

UNITED STATES PATENT OFFICE 2,303,260

SHEET METAL CLAMP

Leo di Rebaylio, Culver City, Calif., assignor to Products Engineering Company, Los Angeles, Calif., a copartnership composed of L. A. Spievak and Louis Wallace, as copartners Application September 24, 1941, Serial No. 412,197

1 Claim. (Cl. 85—5)

This invention relates to sheet metal clamps for the special purpose of holding sheets of metal together with preformed rivet holes in exact registration for the insertion of rivets to be headed to attach one sheet to another. Any number of appliances such as this invention may be used at the same time for the purpose stated.

The object of this invention is the production of a sheets clamp of the character described having a special and individual construction and arrangement of its parts found to be in practice particularly effective in operation, and of simple mechanism readily understood, applied and operated.

In the accompanying drawing forming a part of this application for a patent, Fig. I is a partly sectional view of all parts assembled showing the movable member in its extended position.

Fig. II is a view similar to Fig. I representing the movable member in its position when drawn against the stationary member.

Fig. III is a cross sectional view of the members taken on the line 3—3 of Fig. I.

Fig. IV is a side view of the body portion shown somewhat reduced in size.

Fig. V is a side view of the body showing the open recess or slot in the end thereof and the seat for the end of the stationary member.

Fig. VI is a view taken from the slotted end of the body.

Fig. VII is a side view of the stationary member detached.

Fig. VIII is a side view of the stationary member detached and turned one quarter way around from the position of Fig. VII.

Fig. IX is a side view of the movable member showing the T-shaped form.

Fig. X represents an end view of the head of the movable member and face of the shank thereof.

Throughout the drawing and description the same number is used to refer to the same part.

The body portion 1 has attached thereto a cam end 2 of the handle 9, the connection being pivotal on the pin 11. The cam end of the lever is located and operates in the open slot 12 shown in the body portion 1. There will be noted the flanged or shouldered end 5 of the body 1 and in Fig. I it is shown that the coil spring 6 around the body contacts at one end with the end flange 5 of the body and at the other end with the head 4 of the T-shaped movable member.

Passing through the metal sheets 7 will be noted the stationary member 3 which projects beyond the sheets, and also the shank 8 of the movable member. Together the members form a relatively cylindrical portion which can be introduced through rivet holes in the associated sheets 7. As usually constructed the stationary member 3 which is located in the longitudinal bore 14 of the body has a bent end 15 that is passed into an orifice 13 leading into the bore of the body thus holding the member 3 in place against movement.

The leg or shank 8 of the movable member 4 is resilient at its end and is provided with an inclined portion 10. When the handle 9 is turned into the position shown in Fig. I the two plates adjusting members 3 and 10 may be passed through the rivet holes in the associated plates 7. Now, if the holes do not register exactly, upon moving the handle 9 into the attitude illustrated in Fig. II, the bent end of the member 10 contacts with the projecting point of the member 3 and the two members are separated and the two rivet holes moved to coincide one with the other. In the construction of this invention it will be noted from the description that the stationary member 3 is a rigid fixed piece held in place by the introduction of the projecting end 15 into the orifice 13 shown in Fig. I.

The operation of this invention is thought to be plain from the illustrations. When the cam end of the handle or lever is turned from the position set out in Fig. I into the attitude in Fig. II the inclined end 10 of the movable member bends elastically and the ends of the members are forcibly separated by the extension of the coil spring. It is not intended to limit this invention to the exact size or shape of the spring or lever elements, but the relative formations and arrangement of the movable and stationary members are regarded as improved and important features of the construction herein illustrated and described.

Having now explained this invention, I claim:

In a sheet metal clamp of the character described, a body member having an axial bore and a diametric and longitudinal open slot, a lever constructed with a cam end and pivotally attached in said slot, a movable T-shaped member engaging the bore of the body, the cam end of said lever being arranged to contact with and to operate the said T-shaped member, a coil spring around the said body, the said body having a flanged end constructed and arranged in contact with the said spring, the other end of said spring being in contact with the head of the said T-shaped member, a stationary rigid member arranged in the bore of the body next to the said movable member, one end of the said stationary member projecting from the said flanged end of the body, said movable member having an inclined end portion extending below the end of the stationary member when the said spring is compressed whereby the extension of the spring draws the inclined end of the movable member against the end of the stationary member thereby forcibly bending the inclined end from the stationary end pressing said ends of the members apart.

LEO DI REBAYLIO.